US006313429B1

(12) United States Patent
Lampson et al.

(10) Patent No.: US 6,313,429 B1
(45) **Date of Patent: *Nov. 6, 2001**

(54) DUAL MODE PLASMA ARC TORCH FOR USE WITH PLASMA ARC TREATMENT SYSTEM AND METHOD OF USE THEREOF

(75) Inventors: Robin A. Lampson; Robert E. Haun; Roger S. Brooks; Richard C. Eschenbach, all of Ukiah, CA (US)

(73) Assignee: Retech Services, Inc., Ukiah, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/140,492

(22) Filed: Aug. 27, 1998

(51) Int. Cl.[7] ...................... B23K 9/06

(52) U.S. Cl. ...................... 219/121.57; 219/121.59; 219/121.56

(58) Field of Search ...................... 219/121.37, 121.34, 219/121.54, 121.57, 121.56, 121.59, 121.47; 110/247; 75/10.4

(56) References Cited

U.S. PATENT DOCUMENTS 2,874,265 * 2/1959 Reed et al. ............ 75/10.4
3,248,874 5/1966 Grina .
3,935,825 2/1976 Matthews et al. .
4,014,296 3/1977 Astrom .
4,220,843 9/1980 Borer et al. .
4,312,637 1/1982 Loftus .
4,321,877 3/1982 Schmidt et al. .
4,324,971 * 4/1982 Frappier ............ 219/121.56
4,549,065 10/1985 Camacho et al. .
4,559,439 12/1985 Camacho et al. .
4,580,032 4/1986 Carkhuff .
4,587,397 5/1986 Camacho et al. .
4,653,677 3/1987 Peters et al. .
4,678,888 * 7/1987 Camacho et al. ............ 219/121.57
4,745,256 * 5/1988 Shubert ............ 219/121.47
4,770,109 * 9/1988 Schlienger ............ 110/247
4,791,268 12/1988 Sanders et al. .
4,830,280 5/1989 Yankoff .
4,864,096 9/1989 Wolf et al. .
4,912,296 * 3/1990 Schlienger ............ 219/121.59
5,017,754 5/1991 Drouet et al. .
5,227,603 7/1993 Doolette et al. .
5,301,620 4/1994 Nagel et al. .
5,331,906 7/1994 Sonoda et al. .
5,362,939 11/1994 Hanus et al. .
5,376,767 12/1994 Heanley et al. .
5,408,494 4/1995 Schlienger .
5,416,297 * 5/1995 Luo et al. ............ 219/121.57
5,440,094 8/1995 Zapletal et al. .
5,451,738 9/1995 Alvi et al. .
5,451,740 9/1995 Hanus et al. .
5,484,978 1/1996 Hedberg et al. .
5,548,097 * 8/1996 Couch, Jr. et al. ............ 219/121.57
5,548,611 8/1996 Cusick et al. .
5,573,564 11/1996 Richards .
5,601,734 2/1997 Luo et al. .
5,831,237 * 11/1998 Daniel ............ 219/121.54

* cited by examiner

*Primary Examiner*—Teresa Walberg
*Assistant Examiner*—Quang Van
(74) *Attorney, Agent, or Firm*—Townsend and Townsend and Crew LLP

(57) ABSTRACT

A plasma arc torch that is capable of operating in a non-transferred arc mode and a transferred arc mode, and that is intended for use for use with a plasma arc treatment system. The plasma arc torch includes an electrode, a plasma gas ring and a nozzle. At least one power supply within the plasma arc treatment system is connected to the electrode, the nozzle and a workpiece. While the torch operates in a non-transferred arc mode, the non-transferred arc heats gas supplied by the plasma gas ring to create plasma gas that heats the workpiece to raise its conductivity. Once the workpiece is at an appropriately conductive level, the arc is automatically transferred since the ground point can now be found.

2 Claims, 4 Drawing Sheets

DUAL MODE PLASMA ARC TORCH FOR USE WITH PLASMA ARC TREATMENT SYSTEM AND METHOD OF USE THEREOF

BACKGROUND OF THE INVENTION

1. Field of the Invention

The present invention relates to a method and apparatus for starting a plasma arc treatment system, and more particularly, to a plasma torch system that operates in a non-transferred arc (NTA) mode and a transferred arc (TA) mode without changing any mechanical element of the plasma device.

2. Description of the Prior Art

Plasma reactors have been the subject of numerous research and development projects, and often of patents, over the last several decades. By definition, such reactors make use of a plasma gas, forming a heat-generating arc column between two or more electrodes to heat the material to be processed to high temperature, and thus allow desired reactions to occur that would not be otherwise obtainable or economical. The plasma gas forming the arc column consists of a mixture of energetic and/or disassociated molecules, positively charged ions and free electrons obtained from the gas that is subjected to partial ionization by means of an electric arc (usually D.C.) formed between an anode and a cathode. Plasma arc treatment systems are used in applications such as metal melting, powder production, and hazardous waste treatment.

In practice, the plasma gas may often be used as a reactant. Thus, by way of example, oxygen or air may be used for carrying out oxidation. Carbon monoxide or hydrogen may be used for carrying out reduction. Chlorine may be used for carrying out chlorination and nitrogen for nitration.

In the plasma arc treatment chambers, a plasma device transfers electrical energy through a stream of gas so hot that the gas becomes an electrical conductor. The commonly owned U.S. Pat. No. 4,912,296, for example, discloses an advantageous construction for a plasma torch processing system. U.S. Pat. No. 4,770,109 and U.S. Pat. No. 5,136,137, both by the inventor of the aforementioned invention and also commonly owned, disclose and claim reactors for the treatment and melting of all types of materials, particularly hazardous waste, for which the present invention is particularly useful. Both patents are hereby incorporated by reference for all purposes.

Generally speaking, there are two types of plasma devices: non-transferred and transferred. In non-transferred arc devices, both electrodes are contained entirely within the device, for example, between two coaxial rings such that an electrical arc forms in the annular space between the coaxial rings. A gas is passed through the annular area and emitted from an end of the torch.

In transferred arc devices, one electrode is contained in the device and the other electrode is exterior and spaced apart from the device. The other electrode also is usually at the surface of the material to be treated and/or heated. In many circumstances, transferred arc devices are more efficient than non-transferred arc devices.

In the treatment of hazardous waste, equipment suitable for treating waste as described in the aforementioned patents includes a generally cylindrical tub open at the top, rotating about a vertical axis within a sealed chamber, a system for charging material into the tub, a movable plasma arc device mounted above the tub (referred to subsequently as the centrifuge) and electrical connections from an arc power supply to the plasma device and to the conductive base of the centrifuge.

A very important element of the waste treatment process is to melt the inorganic (usually oxide) components of the feed into a slag while evaporating water, organics and most salts. Such a slag is electrically conductive at high temperatures and non-conductive at low. Since the conductive bottom of the centrifuge may be covered by non-conductive slag if the process operation is interrupted, a way to transform the non-conductive layer to the conducting state is needed. The present invention is particularly effective for this purpose.

When the plasma arc treatment system is shut down, an amount of the slag, i.e., a slag skull, is left in the drum to form the slag for a subsequent use. During the down time, the slag cools and may solidify. As the slag temperature drops, the electrical conductivity of the slag also decreases. A problem that occurs when starting the plasma arc treatment system is that the electrical conductivity of the slag may have dropped to a level that will not sustain an arc between the torch and the grounding network. In order to start the treatment system and sustain an arc, the slag must be heated to increase the conductivity.

A conventional method of heating the slag is with an oxyacetylene torch or a non-transferred plasma arc device. In such a device, the plasma arc column permanently extends between the two "built-in" electrodes of the device, even if this column may be blown out of the same by the injected plasma gas, and thereby form an elongated loop.

Plasma arc treatment systems have been developed that include a plasma device that can operate in either a non-transferred arc mode or a transferred arc mode. In such systems, parts must be changed in order to switch between the two modes. This is time consuming and additionally can allow the slag to cool, thus lowering its conductivity. These systems also require an operator to switch between the modes in some type of physical and mechanical fashion. Therefore, these systems are subject to operator error and set-up error. Additionally, they often operate in a preset manner, i.e., the time for switching is predetermined, and thus if this predisposed time is wrong, then valuable time can be wasted in switching between modes at an inappropriate time, i.e., too early, and thus the slag is not yet in a conductive state, or, alternatively, too late and the more efficient and more desirable transferred arc mode is not entered soon enough.

An even bigger problem are systems that do not operate in both modes. In one such system, the non-conductive materials, such as glass, are usually chipped away in order to find a ground path for the transferred arc. This chipping procedure is time consuming and damages refractory systems that line the internal walls of the plasma arc treatment system. Graphite or other electrically conductive metallic rods have also been used with success but have a short operational life in oxidizing environments.

SUMMARY OF THE INVENTION

A plasma arc treatment system in accordance with the present invention and a method of use thereof addresses the shortcomings of the prior art.

In accordance with one aspect of the present invention, a method of operating a plasma arc treatment system that treats a workpiece comprises providing a plasma arc device that includes an electrode, a plasma gas ring and a nozzle, and providing at least one power supply with a first terminal connected to the electrode, a second terminal connected to the nozzle and a third terminal connected to the workpiece. Gas is supplied to the plasma gas ring and power is provided to the electrode and the nozzle such that a potential difference is created between the electrode and the nozzle thus creating an arc within the gas to create plasma gas. The workpiece is heated with the plasma gas to thereby raise the temperature of the workpiece to a conducting temperature and the arc is automatically transferred from between the electrode and the nozzle to between the electrode and the workpiece once the temperature of the workpiece reaches the conducting temperature (such that the ground point is found by the arc).

In accordance with another aspect of the present invention, two power supplies are provided, a first of which has a positive terminal connected to the electrode and a negative terminal connected to electrical ground, and a second of which has a positive terminal connected to the electrode and a negative terminal connected to the nozzle.

In accordance with a further aspect of the present invention, a method of operating a plasma arc treatment system that treats a melt bath comprises providing a plasma arc device that includes an electrode, a plasma gas ring and a nozzle, and providing at least one power supply having one terminal connected to the electrode, one terminal connected to the nozzle and one terminal connected to the material to be heated. Gas is supplied to the plasma gas ring and power is supplied to the electrode and the nozzle such that a potential difference is created between the electrode and the nozzle thus creating an arc within the gas to form a plasma gas. The workpiece is heated with the plasma gas to a temperature wherein the conductivity of the workpiece is such that adequate current (generally about 100 amperes) may be carried by the workpiece. The arc is then transferred from between the electrode and the nozzle to between the electrode and the workpiece.

In accordance with another aspect of the present invention, a plasma arc treatment system comprises a housing, an interior space defined within the housing, an electrical ground below the interior space, a workpiece within the interior space, a plasma arc device that includes an electrode, a plasma gas ring and a nozzle, and at least one power supply including a first terminal, a second terminal, and a third terminal. The first terminal is connected to the electrode, the second terminal is connected to the nozzle, and the third terminal is connected to the workpiece.

In accordance with a further aspect of the present invention, the plasma arc treatment comprises first and second power supplies each including a first terminal and a second terminal. The first power supply first terminal is connected to the electrode, the first power supply second terminal is connected to electrical ground, the second power supply first terminal is connected to the electrode, and the second power supply second terminal is connected to the nozzle.

Accordingly, the present invention provides a plasma arc treatment system that includes a torch system that can electrically transition between non-transferred arc mode and transferred arc mode. Each mode of electrical current transfer operates simultaneously but also independently of each other. The hot plasma generated by the non-transferred arc is used to reduce the voltage needed to carry current between the workpiece and the torch. The arc transfers when an electrical ground point is found, without requiring mechanical switching. Thus, operator influence is not required nor is a changing of parts necessary for transferring between non transferred arc mode and transferred arc mode. If electrical ground is not found, then the heat from the non-transferred arc is utilized to bring the workpiece or melt bath to an electrically conductive state.

The plasma arc device is in a constant arc-on situation where the non-transferred and transferred modes proportion according to process conditions.

Other features and advantages of the present invention will be understood upon reading and understanding the detailed description of the preferred exemplary embodiments, found here and below, in conjunction with reference to the drawings, in which like numerals represent like elements.

DETAILED DESCRIPTION OF THE PREFERRED EXEMPLARY EMBODIMENTS

Figure 1:
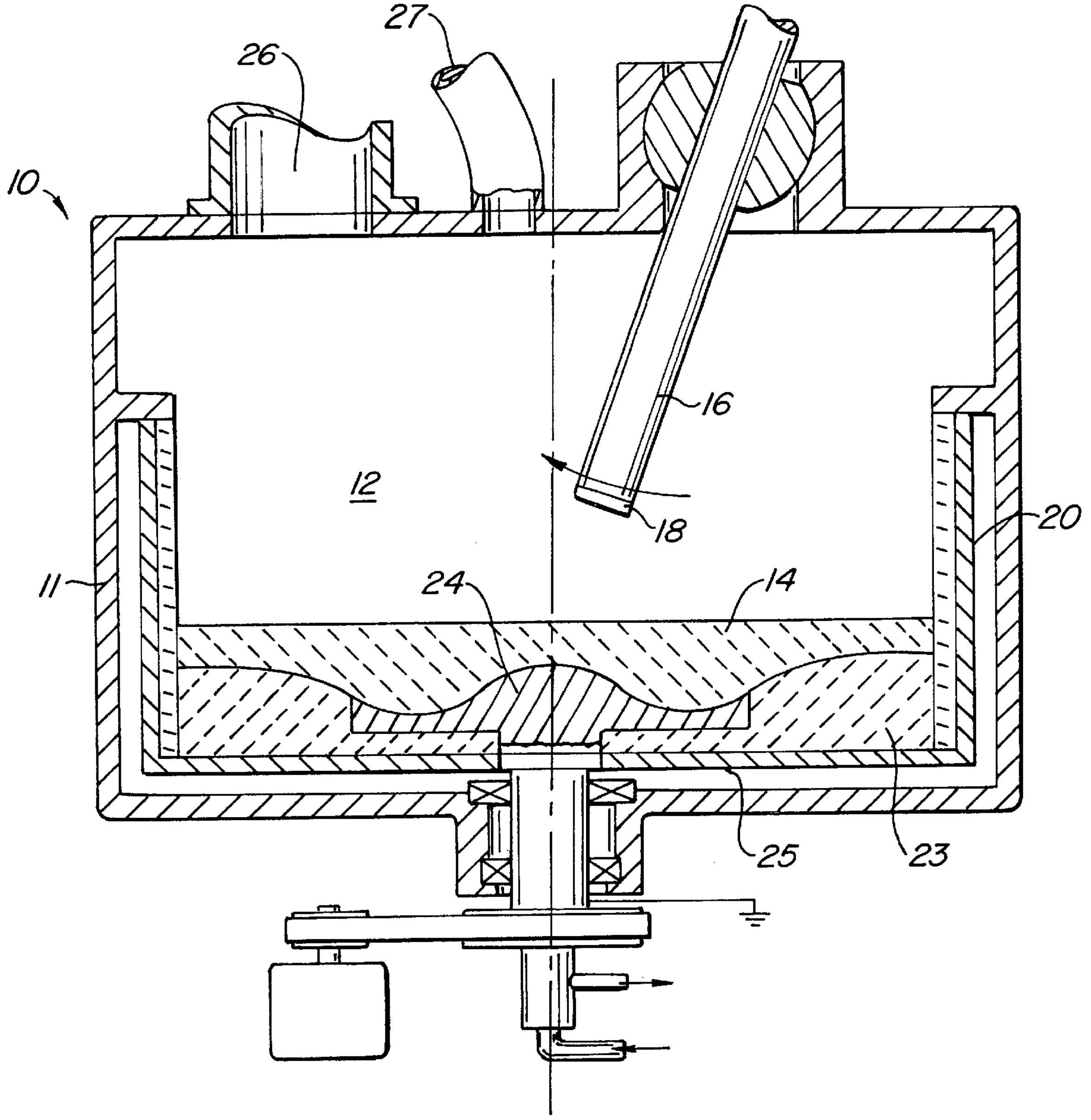
FIG. 1 is a cross-section of plasma treatment system containing a melt bath.

A plasma arc treatment system 10 includes a housing 11 and an interior space 12 containing slag or a workpiece 14. The housing contains an opening 26 for introducing material to be treated and an opening 27 for gas to be removed. An opening for removing condensed phase material is used but not shown. As previously discussed, workpiece 14 may be any of various forms of hazardous and non-hazardous waste, organic matter, inorganic matter, metal, etc. The plasma arc treatment system also includes a plasma arc torch 16 that includes an electrode therein (not shown), a plasma gas ring (not shown), and a nozzle 18. The system further may include two power supplies (shown in FIG. 2) but, as will be described further herein, may have only one power supply.

A material receiving drum 20 is mounted within interior space 12. Material receiving drum 20 is preferably rotatable with respect to housing 11 but may also be fixed with respect to the housing. The bottom of the material receiving drum is preferably covered by an appropriate, e.g., conductive refractory 22. The conductive refractory is preferably made at least partially of graphite, carbon and/or silicon carbide. The conductive refractory may also include a steel matrix for increasing the conductivity of the refractory. When treating metal, the conductive refractory layer may be omitted.

Preferably, at least the bottom of the drum is maintained at ground. This may be accomplished with an electrical grounding network 23 that may include a conducting member 24. Known arrangements may be used to maintain the drum base 25 at ground potential.

Figure 2:
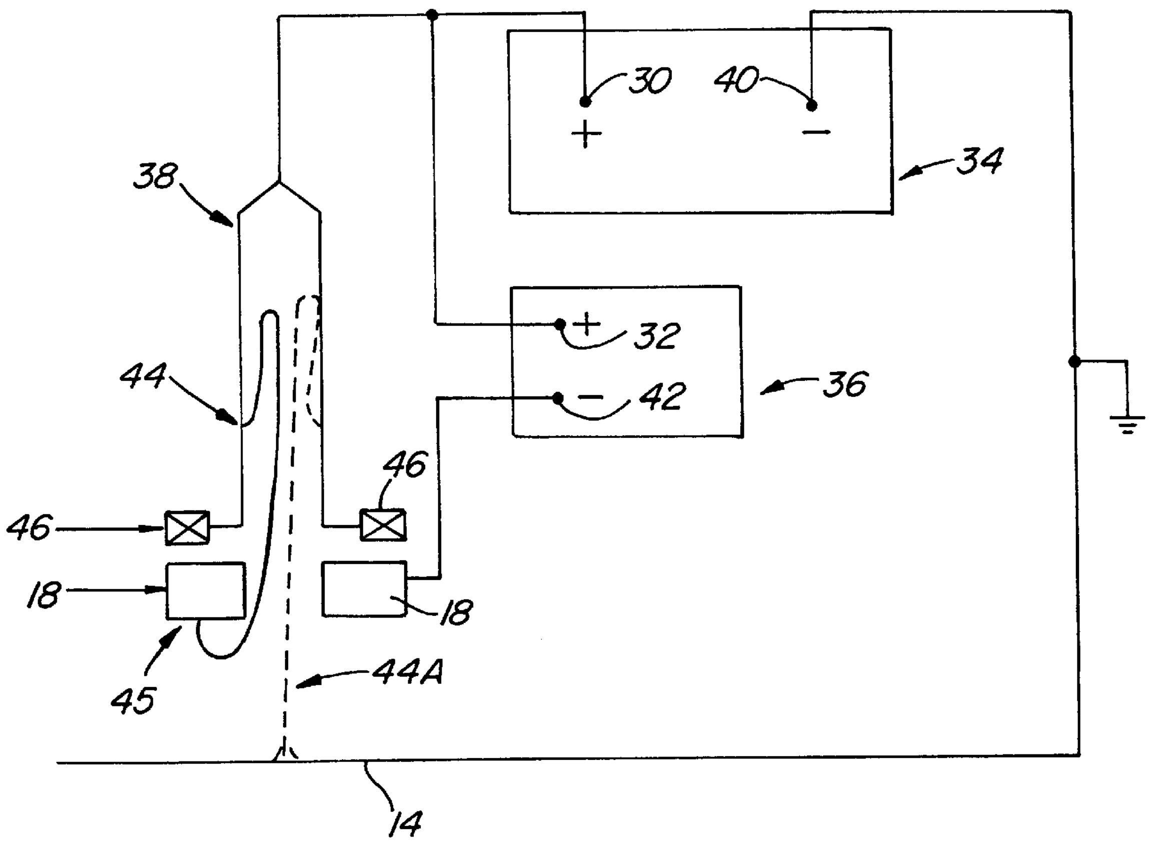
FIG. 2 is a schematic of a dual-mode torch with a two power supply configuration.

With respect to FIG. 2, the first terminal 30, 32 of both power supplies 34, 36 are attached to electrode 38. First power supply 34 has a second terminal 40 connected to electrical ground and workpiece 14 while second terminal 42 of the second power supply 36 is connected to nozzle 18.

Accordingly, during operation, power supplies 34, 36 create a positive electrical potential at electrode 38. Terminal 42 of power supply 36 creates an electrical potential at nozzle 18 which is negative with respect to that of electrode 38. Thus, an arc 44 develops between the electrode and the nozzle due to the difference in potential. Gas is supplied by plasma gas ring 46 in such a manner as to create a swirling or vortex motion within device 16. Arc 44 converts the gas into plasma gas. This plasma gas creates heat and is used to heat workpiece 14 in a manner as described previously with respect to a non-transferred mode of operation for a plasma arc torch.

When workpiece 14 is sufficiently heated and reaches a conductive state, arc 44 is automatically transferred, as indicated by broken line 44*a,* to workpiece 14 because of the electrical ground potential of drum 20 and workpiece 14 as the current searches for a return path.

Nozzle 18 is preferably relatively short such that arc 44 projects outwardly therefrom in a substantially J-shape. In a preferred embodiment, the length of nozzle 18 is substantially twice the diameter of the nozzle opening. As can be seen in FIG. 1, arc 44 ends outwardly from nozzle 18 and terminates on front face 45 of the nozzle. With longer nozzles, arc 44 terminates within nozzle 18 or elsewhere with torch 16.

Due to the heat created by arc 44 at front face 45 of the nozzle, nozzle 18 needs to be cooled, preferably water cooled. If not properly cooled, the nozzle, which is preferably made of copper to promote conductivity, will melt.

In order to facilitate the automatic transfer of the arc, the potential at nozzle 18 "floats" during the non-transferred mode of operation. Nozzle 18 is, for example, initially at a potential of negative 100 volts, while electrode 38 is maintained at a potential of 500 volts. When the current at the nozzle is less than one amp, the potential at nozzle 18 generally has reached, for example, 150 volts, while electrode 38 is maintained at, for example, 500 volts. Meanwhile, workpiece 14 has been heated to such a conductive state that it carries between 50 amps and 100 amps or more. At this time, due to the difference in potential between electrode 38 and ground versus the difference in potential between electrode 38 and nozzle 18, the arc as indicated by 44*a,* will have transferred.

During operation, the hot plasma gas generated by the non-transferred arc is used to reduce the electrical resistance between the workpiece and the device. The power for the transferred portion of the arc is initiated at the same time as that for the non-transferred arc. Having this full electrical potential present with a reduced resistance, the arc transfers when an electrical ground point is found. Accordingly, the switch between non-transferred mode and transferred mode takes place without operator influence. If an appropriate ground point is not found by the arc, then the heat from the non-transferred arc is utilized to bring the workpiece to an electrically conductive state. This electrical system transfers very quickly because it applies full power supply open circuit voltage across the transfer gap.

Thus, the plasma arc treatment system operates simultaneously in the non-transferred arc mode and the transferred arc mode, automatically transferring the arc at the most suitable time. There is no predisposition for the transfer, no changing of parts needed, and no physical switching necessary. Thus, time required for the process is reduced and chance for operator error is also reduced.

Figure 3:
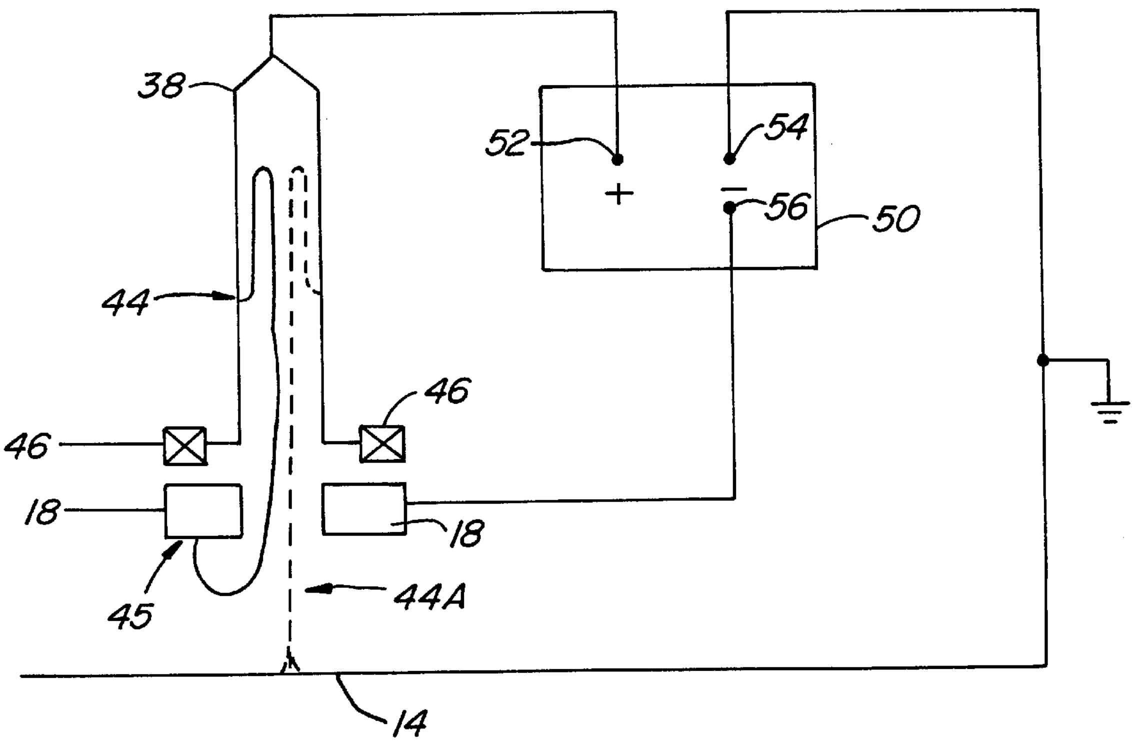
FIG. 3 is a schematic of a dual-mode torch schematic with a single power supply configuration.
Figure 4:
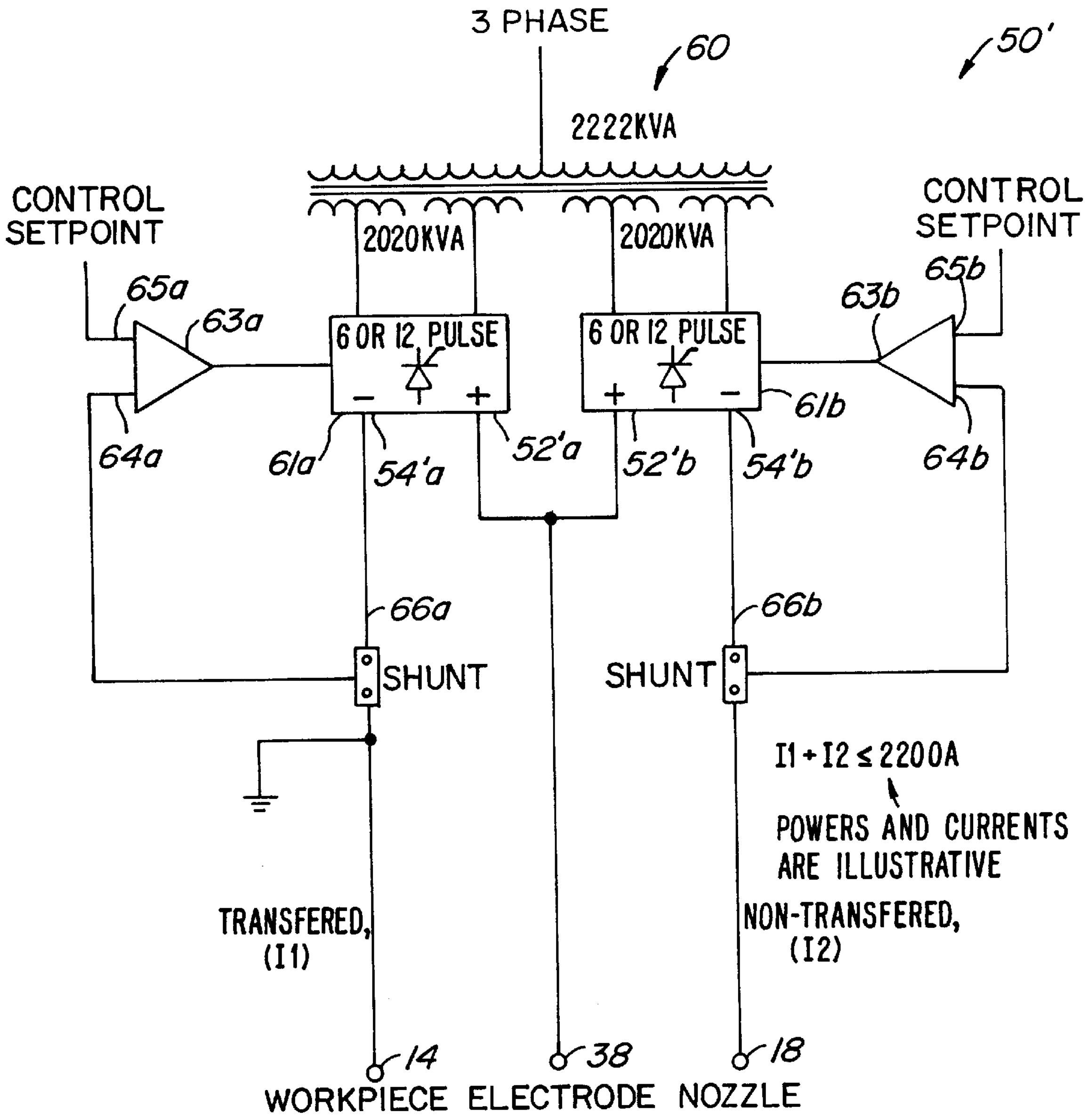
FIG. 4 is a schematic of a power supply for use with the dual-mode torch of FIG. 3.

FIG. 3 illustrates an alternative embodiment wherein only one power supply 50' is used. An example of a power supply 50' for use with the embodiment of FIG. 3 is schematically illustrated in FIG. 4. Power supply 50' includes a three phase transformer 60 and two controlled rectifiers 61*a, b,* each having a first terminal 52'*a, b,* and a second terminal 54'*a, b.* Two control op-amps 62*a, b* are provided to control the rectifiers. Outputs 63*a, b* of the op-amps are input to their respective rectifiers 61*a, b* while inputs 64*a, b* are shunted with their respective rectifier's second terminal 54'*a, b.* Inputs 65*a, b* are the control setpoints for the op-amps and thereby the rectifiers.

Terminal 52'*a, b* is connected to electrode 38. Terminal 54'*a* is connected to workpiece 14 while terminal 54'*b* is connected to nozzle 18. Within power supply 50', transformer 60 is used to deliver AC to the two independent rectifiers, which then deliver DC to the electrode, the nozzle and the workpiece.

As with the embodiment that uses two power supplies, the potential at nozzle 18 floats. Nozzle 18 is once again preferably short and of a length sufficient to allow the arc to extend out of the bore defined within the nozzle, terminating on front face 45 of the nozzle. Preferably, the length of the nozzle is approximately twice the diameter of the bore. Once again, nozzle 18 needs to be cooled, preferably water cooled.

Control op-amps 62 control the rectifiers such that the voltages at nozzle 18 and workpiece 14 are effectively monitored to allow for automatic transfer of the arc from nozzle 18 to workpiece 14. The control setpoints of the op-amps drive the rectifiers such that the potential at nozzle 18 will increase as the current along line 66*b* decreases and the current along line 66*a* increases. This occurs as the workpiece heats during the non-transferred mode and thus its conductivity increases until such time as the arc automatically transfers from nozzle 18 to workpiece 14. Generally, this occurs once workpiece 14 carries approximately one amp.

Once again, an example of a range of voltages includes electrode 38 having a potential of positive 500 volts initially, nozzle 18 having a potential of negative 100 volts initially, and workpiece 14 having a potential of zero volts or being at ground. During operation and leading up to the transfer of the arc, the potential at nozzle 18 floats and eventually finishes, for example, at positive 150 volts while electrode 38 is maintained at, for example, positive 500 volts and workpiece 14 remains at ground.

An advantage of the single power supply embodiment having a single primary transformer and two rectifier circuits is that the primary transformer KVA rating, which determines the amount of iron and copper needed, does not need to be higher than that needed for the bridge that delivers transferred arc current between the electrode and the workpiece.

Preferably, terminals 52'*a, b* (electrode) polarities are positive and terminal 54'*a* is connected to ground (workpiece). However, the polarity may be changed to make the electrode negative with appropriate changes in electrode material. The polarities may likewise also be changed in the two power supply embodiment.

Although the invention has been described with reference to specific exemplary embodiments, it will be appreciated that it is intended to cover all modifications and equivalents within the scope of the appended claims.

What is claimed is:

1. A method of operating a plasma arc system that treats a workpiece, the method comprising:

providing a plasma arc device that includes an electrode, a plasma gas ring and a nozzle;

providing at least one power supply having a first terminal connected to the electrode, a second terminal connected to the nozzle and a third terminal connected to ground and to the workpiece;

supplying gas to the plasma gas ring;

applying a first electrical potential to the electrode and applying a second electrical potential different from the first potential to the nozzle such that a potential difference is created therebetween;

initiating a first arc between the electrode and the nozzle to form a plasma gas;

heating the workpiece with the plasma gas to thereby raise the temperature of the workpiece to a conducting temperature; and automatically initiating a second arc between the electrode and the workpiece whenever the temperature of the workpiece reaches the conducting temperature such that a ground point is found by the second arc without extinguishing the first arc.

2. The method of claim 1 comprising providing two power supplies, a first of which has a first terminal connected to the electrode and a second terminal connected to electrical ground, and a second of which has a first terminal connected to the electrode and a second terminal connected to the nozzle.

* * * * *